United States Patent [19]
Opheim

[11] Patent Number: 5,354,236
[45] Date of Patent: Oct. 11, 1994

[54] METHOD OF CONVERTING CORN PICKER/HUSKER TO REDUCE KERNEL LOSS AND DAMAGE

[75] Inventor: Dale C. Opheim, Graettinger, Iowa

[73] Assignee: Charles Dee, Waukon, Iowa

[21] Appl. No.: 42,511

[22] Filed: Apr. 5, 1993

[51] Int. Cl.⁵ .............................................. A01F 11/06
[52] U.S. Cl. ...................................... 460/149; 460/25; 460/100; 460/119
[58] Field of Search .................. 460/149, 150, 21, 25, 460/114, 119, 100

[56] References Cited

U.S. PATENT DOCUMENTS

| | | | |
|---|---|---|---|
| 4,150,525 | 4/1979 | De Busscher et al. | 460/199 X |
| 4,471,788 | 9/1984 | Meier et al. | 460/29 |
| 4,809,714 | 3/1989 | Recker | 460/35 |
| 4,846,198 | 7/1989 | Carnewal et al. | 460/68 |

Primary Examiner—Terry Lee Melius
Attorney, Agent, or Firm—Brian J. Laurenzo; Kent A. Herink; Brett J. Trout

[57] ABSTRACT

A cost effective and efficient method and apparatus for converting a "husk-off" corn picker into a "husk-on" corn picker to reduce kernel loss and damage. The husking bed of the "husk-off" corn picker is removed and replaced with a corn conveyor consisting of a series of driven flights which convey corn from one end of the picker to the other. The corn conveyor is set at an elevated angle so that the uptake end is lower than the deposit end of the conveyor. A suction fan is attached to the picker above the corn conveyor and sets of rubber air dams are placed around the conveyor to increase the effectiveness of the fan. An air inlet means is provided in the side of the picker so that the suction means can pull air under the corn conveyor and across the deposit end of the corn conveyor as the ears of corn fall from the conveyor. This directed air flow pulls the debris from the ears of corn as the ears fall and carry the debris into the suction means where it is blown out and away from the corn picker.

33 Claims, 5 Drawing Sheets

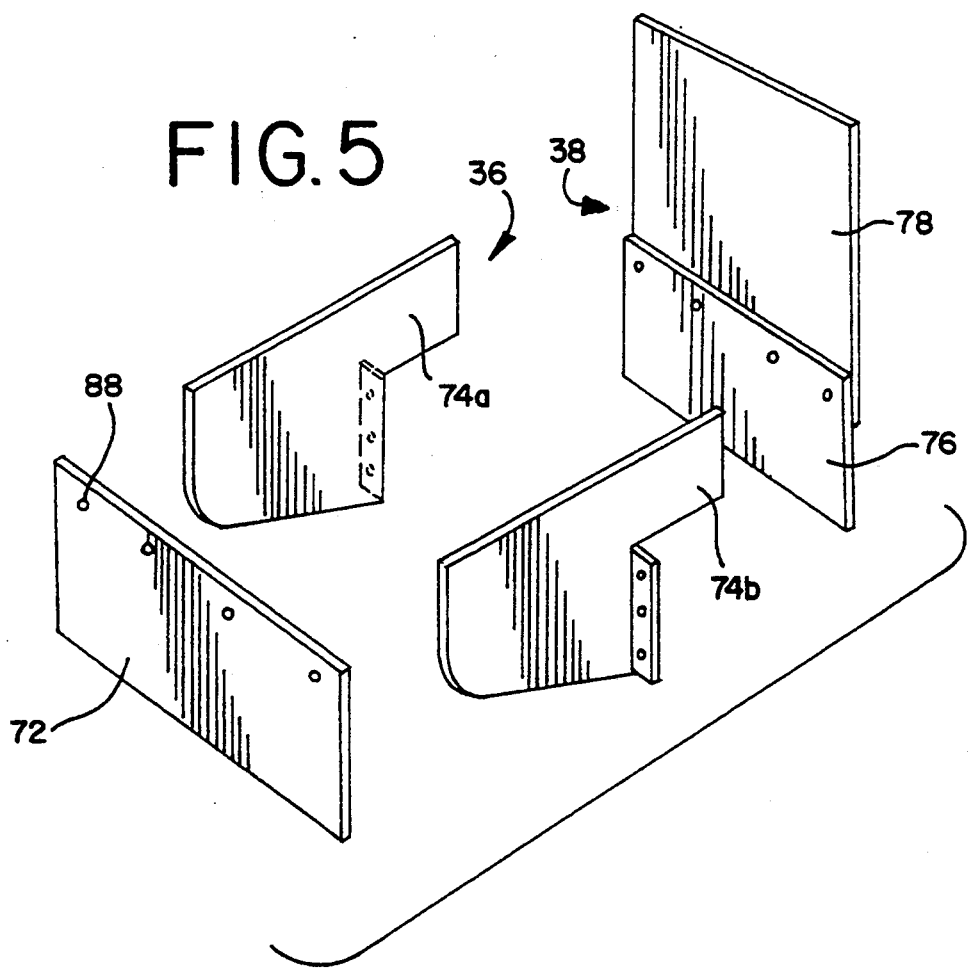
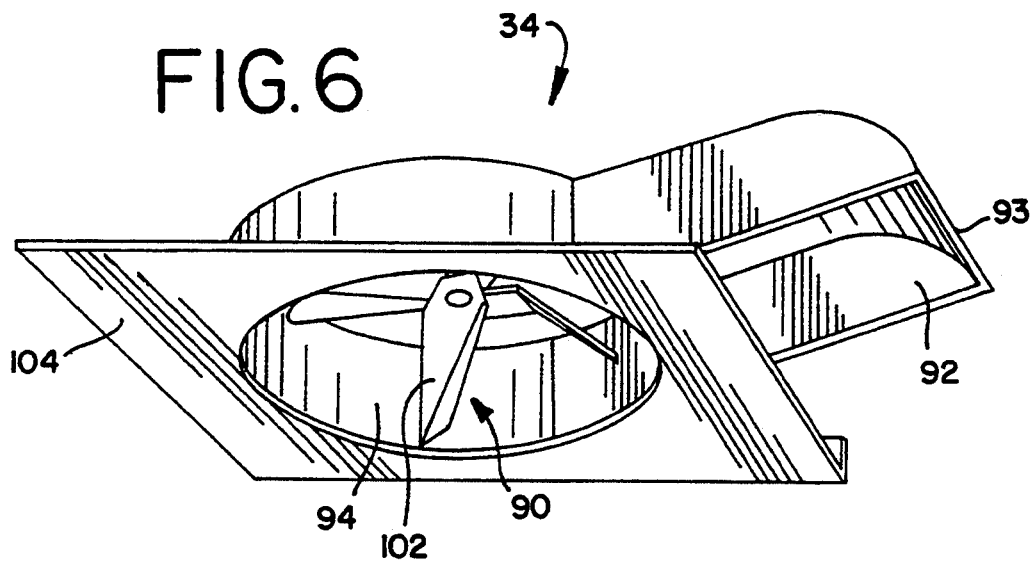

METHOD OF CONVERTING CORN PICKER/HUSKER TO REDUCE KERNEL LOSS AND DAMAGE

BACKGROUND OF THE INVENTION

The present invention relates generally to the picking of corn and, more particularly, to a process for modifying a corn picker to reduce kernel loss and damage.

Generally speaking, there are two types of agricultural implements used to pick seed corn. A "husk-on" type picker pulls ears of corn from stalks and disposes of most loose waste material while leaving husks attached to the ears of corn. The "husk-on" type picker will then generally move the ears of corn along a conveyor where the ears are eventually deposited in a storage vehicle. A "husk-off" type picker generally performs the same function as the "husk-on" picker, but additionally directs the ears of corn over a husking bed which removes and discards most of the husks. The husking bed usually consists of a series of threaded cylindrical rollers which are placed next to one another with their longitudinal dimension and axis of rotation parallel to the direction of movement of the ears of corn across the rollers. As the rollers rotate they move the corn along the longitudinal direction of the rollers and pinch the husks between the rollers. This action pulls the husks away from the ears of corn as the corn is transported over the bed. Because the spacing between the rollers is so small only the husks are pulled down between the rollers, the "husked" ears remain above the rollers and continue to move along the husking bed until the husks are completely removed. After the husks have been removed from the ears of corn the "husk-off" picker, like the "husk-on" picker, will generally move the ears of corn along a conveyor where the ears are eventually deposited into a storage vehicle.

Due to the advantage of being able to pick and husk the corn in a single step, many farmers have opted for "husk-off" type pickers. Recently, however, many seed companies have shown a preference for having their corn picked by "husk-on" pickers. Although husking beds and roller assemblies are quite effective in removing husks from ears of corn during the husking process, the rollers have a tendency to remove some of the kernels from the ear and damage some of the kernels which remain on the ear.

Unlike operations which grow corn for animal or human consumption, seed corn growers invest much more time and money in each kernel. Furthermore, while a small percentage of damaged kernels are generally not a significant problem in corn harvested for consumption, damaged kernels are often worthless for seed corn purposes. Today, many seed companies feel that the added cost of having to shuck the corn in an extra step is outweighed by the extra quality and quantity of the more valuable seed corn kernels obtained through the more delicate "husk-on" technique.

Farmers who have made the substantial investment in a "husk-off" picker are thus faced with the additional equal investment for a separate "husk-on" picker required by many seed companies to pick seed corn. It would be desirable for these farmers seeking to pick corn with the husks on to convert their "husk-off" pickers to "husk-on" pickers.

Attachments are available which allow a "husk-off" picker to pick corn with the husk on, but these attachments are often costly and time consuming to install. Additionally, many attachments require alteration of the corn picker to such a degree that conversion back to a "husk-off" corn picker is often impossible making the conversion an irreversible, as well as costly, decision. Many farmers only need to pick corn with the husk on for a short period of time or for a specific project before going back to picking the corn with the husk off. For these farmers neither the substantial investment in a separate "husk-on" picker nor the irreversible methods of converting their corn pickers are a viable option.

The difficulties encountered in the prior art discussed hereinabove are substantially eliminated by the present invention.

SUMMARY OF THE INVENTION

Accordingly, it is an object of the present invention to provide a method for modifying a "husk-off" corn picker to reduce damage to the corn kernels during harvesting.

A further object of the present invention is to provide a method for modifying a "husk-off" corn picker which reduces corn kernel loss during harvesting.

Another object of the present invention is to provide a method for modifying a "husk-off" corn picker which is relatively simple and inexpensive to install.

Still another object of the present invention is to provide a method for modifying a "husk-off" corn picker into a "husk-on" corn picker wherein the picker may be easily reconverted back into a "husk-off" corn picker.

Yet another object of the present invention is to provide a method for modifying a "husk-off" corn picker wherein the resulting picker requires less air-moving machinery than typical conversion methods making the modification faster, cheaper, and easier to install and maintain.

Another object of the present invention is to provide a corn picker conversion kit which can be used to convert a "husk-off" corn picker to a "husk-on" corn picker.

These and other objects of the invention will become apparent upon reference to the following specification, drawings and claims.

By the present invention, it is proposed to overcome the difficulties encountered heretofore. To this end, a corn picker which is designed to harvest corn and remove the husks is converted into a corn picker which is designed to harvest the corn while leaving the husks attached to the ears of corn. To accomplish this conversion, the corn picker's air-moving means, which are used to removed debris from the ears of corn after the ears have been shucked by a husk removal means, are removed from the corn picker. The corn picker's husk removal means is removed and replaced with a conveyor means. A suction means is placed above the end of the conveyor means and air damming means are placed around the conveyor means to provide more efficient movement of air. An air inlet means is placed in the side of the corn picker to allow air to be drawn through the corn and an exhaust means is provided for removing waste and air that has been pulled through the corn.

BRIEF DESCRIPTION OF THE DRAWINGS

In the drawings:

FIG. 5 is a perspective view of the air damming covers used to maximize air flow around the corn by the method of this invention;

FIG. 6 is a perspective view of the exhaust fan used to replace the squirrel cage fan of the "husk-off" corn picker by the method of this invention;

DETAILED DESCRIPTION OF THE INVENTION

Figure 1:
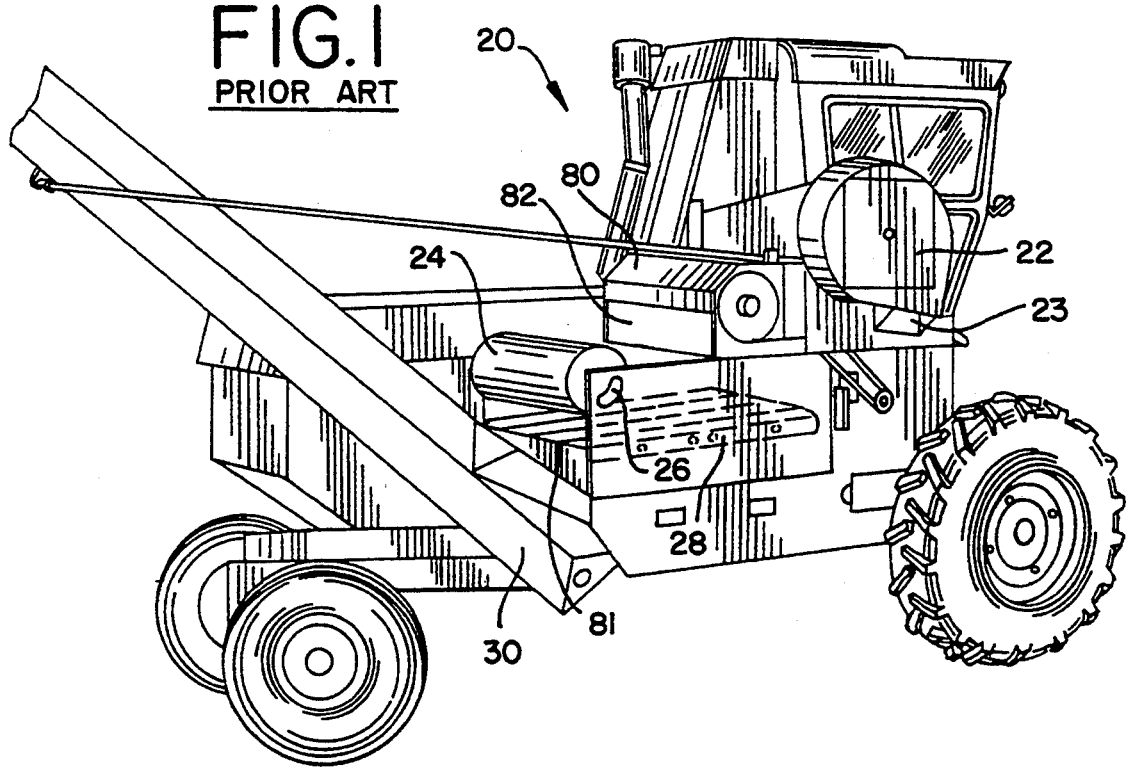
FIG. 1 is a perspective view of a "husk-off" corn picker of the prior art.

A process for converting a "husk-off" corn picker into a "husk-on" corn picker is illustrated wherein a husking bed 28 of a "husk-off" corn picker 20 is removed and a corn conveyor 32 is installed in its place. Rubber air-dams 72 and 76 are installed at each end of the conveyor 32 to increase the air flow across the corn coming off of the conveyor 32. An air inlet means 106 is provided which allows air to be drawn into the interior of the corn picker 20. A specially designed suction fan assembly 34 is installed above the conveyor 32 to replace the squirrel cage fan 24 which is mounted on the top of the corn picker 20. This suction fan assembly 34 draws air through the corn before forcing the air and waste out away from the picker 20. By this method and apparatus a "husk-off" corn picker is effectively converted to a "husk-on" corn picker.

Figure 2:
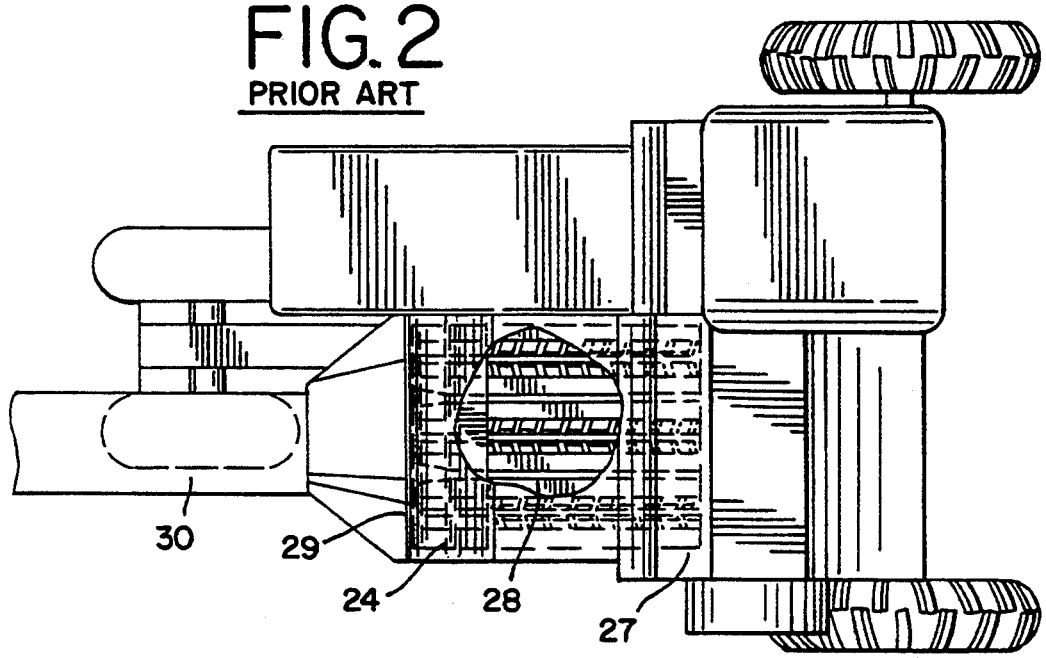
FIG. 2 is a top plan view of the "husk-off" corn picker shown in FIG. 1 with certain portions removed to show the husking bed and squirrel cage fan components thereof.
Figure 3:
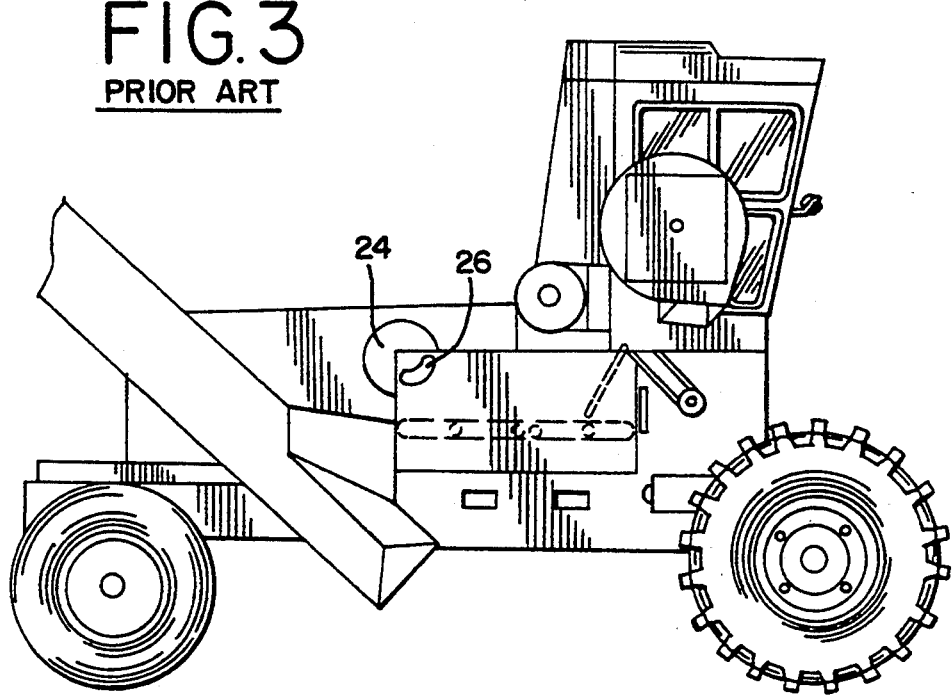
FIG. 3 is a side elevational view of the "husk-off" corn picker shown in FIG. 1 with certain portions removed to show the husking bed and the squirrel cage fan components thereof.

In the figures, a "husk-off" corn picker 20 of the prior art is shown (FIG. 1). After the corn has been picked and removed from the stalk by the picker 20, the ears of corn are deposited onto a husking bed 28. The husking bed 28 consists of a series of alternating threaded cylindrical rollers and gripping cylindrical rollers laid horizontally next to each other and parallel to the longitudinal dimension of the corn picker 20 (FIG. 2). As the cylindrical rollers are rotated, the ears of corn center themselves to lay parallel to the rollers within the valleys which exist between the rollers. As the rollers rotate, the threaded rollers move the ears along the bed 28 while the gripping rollers pinch the corn husks against the threaded rollers and pull the husks downward between the rollers. Because the ears of corn are too large to be pulled between the rollers the husks break loose from the ears of corn. The husks are discarded and under the bed 28 and the ears of corn continue to travel along the bed 28 toward the chute conveyor 30. Upon reaching the end of the husking bed 28 the ears of corn fall downward and land on the chute conveyor 30. The ears of corn are then carried up the chute conveyor 30 where they are deposited into a transport vehicle (not shown).

The prior art corn picker has an attached squirrel cage fan 24 and suction fan 22 which act in concert to remove loose debris and husks travelling along the husking bed 28 with the ears of corn (FIG. 1). The squirrel cage fan 24 draws air through an inlet 26 in the side of the fan and forces the air downward and over the husking bed 28 thereby blowing the loose debris off the husking bed and toward the suction fan 22. The suction fan 22 acts with the squirrel cage fan 24 to draw debris from the husking bed 28 toward the suction fan 22 and expel the debris through the waste outlet 23.

Openings are provided both above 82 and below 81 the squirrel cage fan 24 to allow more air to circulate around the husking bed 28 and to prevent strain on the suction fan 22 that would occur from the suction fan 22 operating in a closed system. The squirrel cage fan 24 augments these openings 81 and 82 by generating more air across the husking bed 28 where it is needed most.

Figure 4:
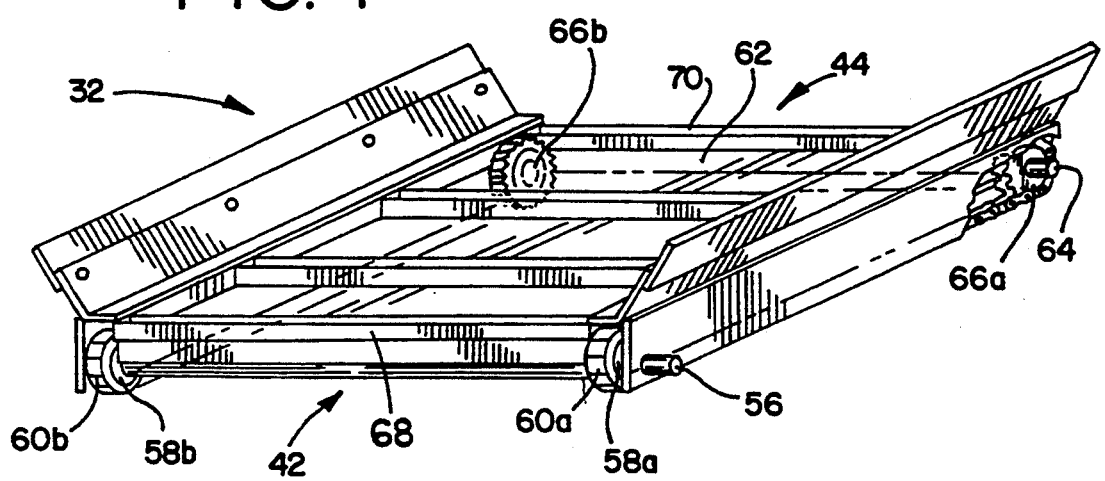
FIG. 4 is a perspective view of a corn conveyor used to replace the husking bed when converting a "husk-off" corn picker by the method of this invention.
Figure 7:
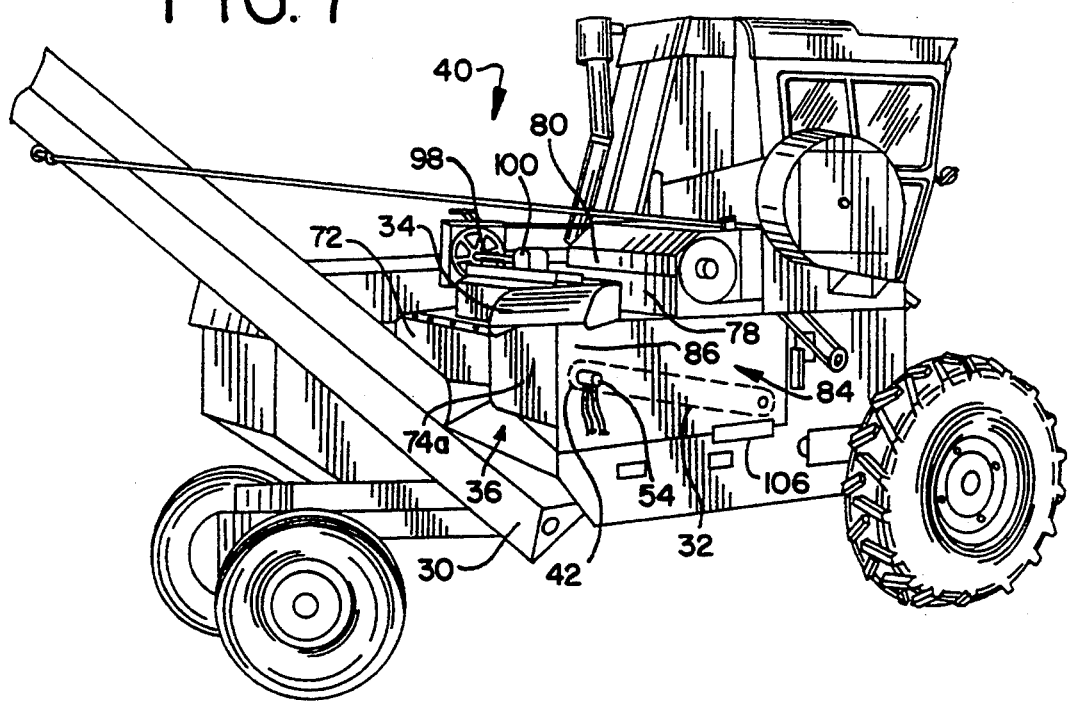
FIG. 7 is a perspective view of a "husk-off" corn picker converted to a "husk-on" corn picker by the method of the present invention.
Figure 8:
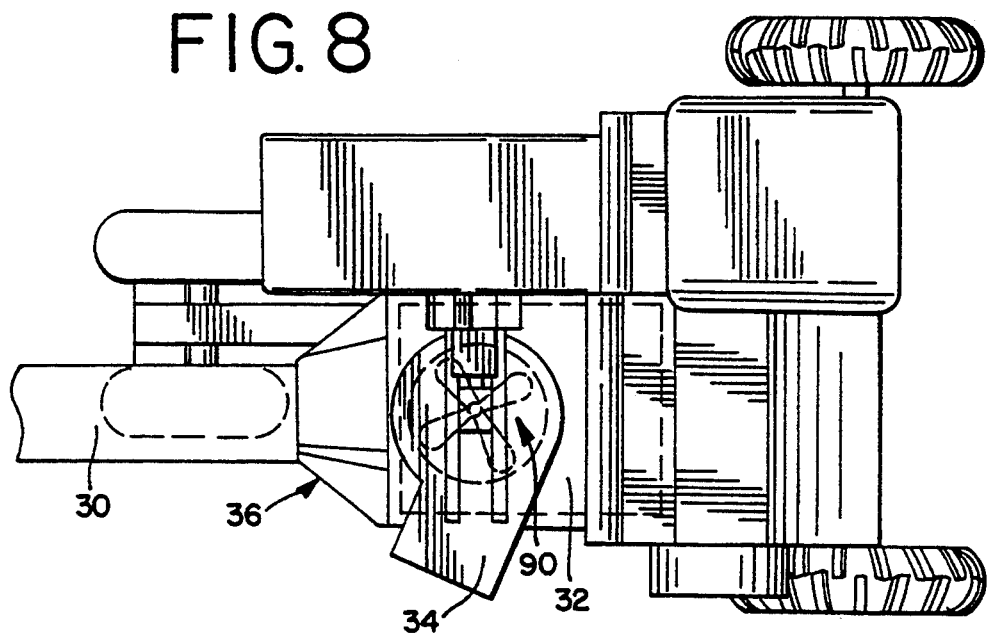
FIG. 8 is a top plan view of the converted corn picker shown in FIG. 7 with certain portions removed to show the corn conveyor and exhaust fan components thereof.

To convert a "husk-off" picker 20 to a "husk-on" picker 40, the husking bed 28 must be removed and replaced with a corn conveyor 32 as shown in FIG. 4. The husking bed 28 is removed carefully so that the bed 28 may be reinstalled if it desired to reconvert the resulting "husk-on" picker 40 back into a "husk-off" picker 20. In the preferred embodiment, the corn conveyor 32 is mounted in the space previously occupied by the husking bed 28 by bolts or similar securement means. The deposit end 42 of the corn conveyor 32 is elevated slightly above the uptake end 44 of the corn conveyor 32 to allow the air entering through an air inlet means 106 located below the conveyor 32 to travel along the underside of the corn conveyor 32 and up through the corn as it falls off the corn conveyor 32 and onto the chute conveyor 30 (FIG. 7). In the preferred embodiment, the air inlet means 106 comprise the provision of a four inch by nine inch rectangular opening 106 in the side of the corn picker 20 below the corn conveyor 32.

Figure 10:
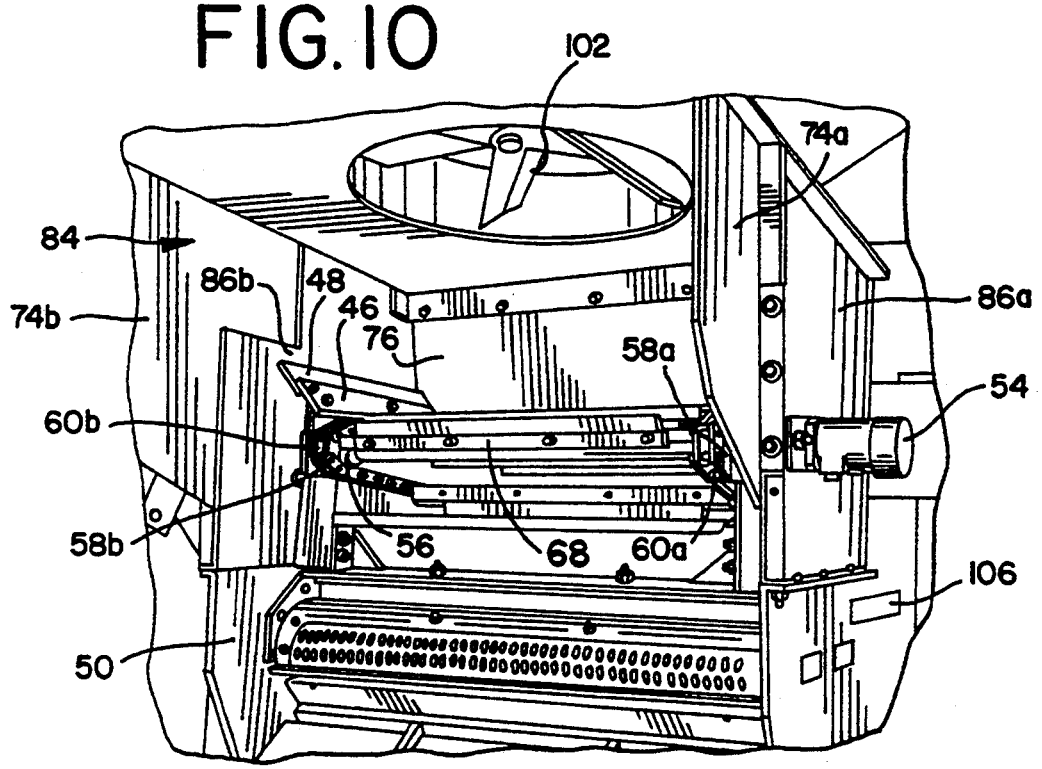
FIG. 10 is a perspective view of the corn conveyor chamber of the converted corn picker shown in FIG. 7 with the front air dam removed.

The sides 46 of the conveyor 32 have rubber edges 48 which press against the interior sides 50 of the corn picker 20 to prevent air flow around the sides 46 of the conveyor 32 and to prevent ears of corn from falling off the sides of the conveyor 32 (FIG. 10). A driving means is provided to rotate a rearward conveyor axle 56. The driving means can be run at various speeds to match the speed of the conveyor 32 to the amount of corn being picked. In the preferred embodiment the driving means comprise a hydraulic motor 54 but the driving means can be any power source including an engine of the picker if the engine were operably connected to the conveyor axle 56.

Two sprockets 58a–b are connected to the axle 56 and drive dual chains 60a–b around and under the conveyor bed 62 (FIG. 4). On the uptake end 44 of the conveyor 32 is an axle which is similar to the rearward conveyor axle 56, but is not driven. The non-driven axle 64 also has two sprockets 66a–b mounted thereto which return the chains 60a–b around and over the conveyor bed 62. A plurality of flights 68 are perpendicularly attached to and propelled by the conveyor chains 60a–b over the conveyor bed 62. These flights 68 push the corn toward the deposit end 42 of the conveyor 32. In the preferred embodiment the flights 68 comprise steel bars operably connected to the conveyor chains 60a–b. The flights 68 may also be provided with rubber extensions 70 which prevent the ears of corn from being damaged as they are deposited on the conveyor 32.

Air damming means are secured to the picker 20 to maximize air flow around the corn as it falls from the corn conveyor 32 to the chute conveyor 30. In the preferred embodiment the air damming means are air damming assemblies 36 and 38, as shown in FIG. 5, and are constructed of rubber and steel sheets. The front air damming assembly 38 consists of a rubber dam 76 connected to a steel sheet 78. The steel sheet 78 of the front air damming assembly 38 is mounted to the corn picker's 20 auger housing 80 so that the steel sheet 78 substantially covers the opening 82 into the conveyor chamber 84 shown in FIG. 1 (FIG. 7). In the preferred embodiment the front air damming assembly 38 extends into the conveyor chamber 84 far enough so that the rubber dam 76 contacts the conveyor bed 62 (FIG. 10).

The rear air damming assembly 36 is fastened to the sides 86a–b of the corn picker 20 near the deposit end 42 of the conveyor 32 to increase the air flow around the corn produced by the suction fan and exhaust assembly 34 (FIG. 7). The side plates 74a–b are mounted to the sides 86a–b of the conveyor chamber 84 and are of a shape sufficient to substantially restrict air from entering the conveyor chamber 84 through the sides of the corn picker 20. The bottoms of the side plates 74a–b are angled so as to substantially match the angle of the chute conveyor 30 (FIG. 5). These matched angles prevent air from entering the conveyor chamber 84 through gaps between the chute conveyor 30 and the rear air damming assembly 36 (FIG. 7). The sides of the rubber dam 72 of the rear air damming assembly 36 are fastened to the side plates 74a–b of the damming assembly 36 while the bottom of the rubber dam 72 rests against the chute conveyor 30 to restrict air flow around the conveyor 30 (FIG. 7). In the preferred embodiment, the top of the rubber dam 72 has securement holes 88 located along its upper edge so that it may be secured to the suction fan and exhaust assembly 34 after the assembly 34 has been installed (FIG. 5). The rubber dam 72 may, of course, be secured to the suction fan and exhaust assembly 34 by any securement method which substantially restricts air from passing by the securement means into the conveying chamber 84. The rear air damming assembly 36 is fastened to the corn picker 20 so that all sides of the assembly 36 overlap or are substantially contiguous with some part of the corn picker 20 (FIG. 7). The assembly 36 is attached securely to the corn picker 20 with bolts or similar securement means to prevent a substantial amount of air from flowing into the corn picker 20 from around the assembly 36 and to eliminate the need for a second fan which must be attached with most standard "husk-on" corn picker conversion kits. As with the rubber dam 72, the rest of the damming assembly 36 may be fastened to the corn picker 20 by bolts or any means which prevents a substantial amount of air from entering the conveying chamber 84 from outside of the corn picker 20.

Figure 9:
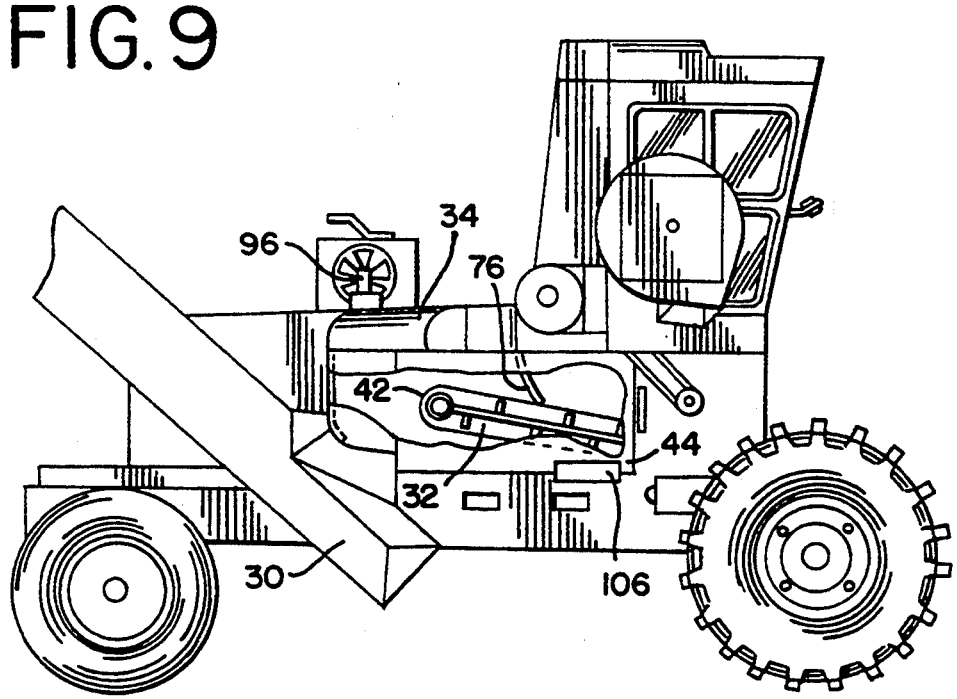
FIG. 9 is a side elevational view of the converted corn picker shown in FIG. 7 with certain portions removed to show the elevated corn conveyor and the rear air dam components thereof.

A suction fan and exhaust assembly 34 is provided for attachment above the deposit end 42 of the corn conveyor 32 (FIG. 6). In the preferred embodiment, the assembly 34 consists of a fan 90, an exhaust duct 92 and a circular recessed fan housing 94. The fan 90 rests within the recessed housing 94 and is driven by a driving means. In the preferred embodiment, the driving means consists of a generally upright shaft 96 (FIG. 9). This generally upright shaft 96 extends through the fan housing 94 and is drivably connected to a generally horizontal shaft 98 by a gearbox 100 or other similar driving means (FIG. 7). In the preferred embodiment the horizontal shaft 98 is driven directly by the engine of the picker 20, but the shaft 98 may be indirectly driven by a hydraulic motor. The fan housing 94 has a lateral aperture which opens into an exhaust duct 92. The exhaust duct 92 extends out over the side of the picker 20 and the waste outlet 93 is angled to direct the waste down and away from the converted picker 40 as the converted picker 40 moves across the ground. In the preferred embodiment, the fan blades 102 are angled to not only draw air and waste upward, but also to direct air and waste out of the exhaust duct 92. The suction fan and exhaust assembly 34 is mounted on the corn picker 20 so that the underside 104 of the exhaust assembly 34 is positioned and fastened contiguous with the interior sides 86a–b of the conveyor chamber 84.

In the preferred embodiment, the fan 90 draws air through an air inlet 106 perforated in the side of the converted corn picker 40 below the conveyor bed 32 (FIG. 9). The air travels underneath the conveyor bed 32 toward the deposit end 42 of the conveyor 32. After reaching the deposit end 42 of the conveyor 32, the air is drawn upward across the ears of corn and debris as the ears and debris leave the conveyor 32. Upon leaving the conveyor 32 the ears of corn fall downward toward the chute conveyor 30 while the loose husks and debris move upward, drawn by the moving air into the fan 90. The debris is thereafter pushed through the exhaust duct 92 by the fan blades 102. After landing on the chute conveyor 30 the corn moves up the chute conveyor 30 to be deposited in a storage vehicle while the loose husks and debris are blown clear of the converted corn picker 40.

The use of the air damming means 36 and 38 in conjunction with the air inlet means 106 eliminates the need for the additional air moving means located on most "husk-on" pickers below the deposit end of the corn conveyor. Along with the elimination of the costs and maintenance associated with an additional air moving means, the present invention method of locating air damming means 36 and 38 and the air inlet means 106 provides a more focused flow of air over the ears of corn to remove the debris more quickly and more efficiently than existing "husk-on" corn pickers or converted "husk-off" pickers.

The foregoing description and drawings merely explain and illustrate the invention and the invention is not limited thereto, except insofar as the claims are so limited, as those skilled in the art who have the disclosure before them will be able to make modifications and variations therein without departing from the scope of the invention. For example, it is anticipated that damming means composed entirely of metal or entirely of rubber may be used instead of damming means comprised partially of metal and partially of rubber.

I claim:

1. A method for converting a corn picker which is designed to remove corn husks into a corn picker which is designed to leave the corn husks substantially on the ears of corn comprising:
   a. providing a corn picker which is designed to harvest the ears of corn while removing the husks from the ears of corn said corn picker comprising:
      (i) a harvesting means for removing the ears of corn from their stalks;

(ii) a husking means used to remove husks from the ears of corn; and (iii) an air moving means for removing debris from the ears of corn after said ears have been husked;

b. replacing said husk removal means with a conveyor means to transport the ears of corn toward a storage area;

c. placing a suction means above the end of said conveyor means to increase the efficiency with which said suction means draws air over the ears of corn;

d. mounting air damming means around said conveyor means to draw air over the ears of corn and debris away from the ears of corn;

e. providing an air inlet means to allow air to be drawn through the ears of corn thereby pulling debris away from the ears of corn and toward said suction means; and f. providing an exhaust means for removing waste and air pulled through the ears of corn to increase the efficiency of said suction means and decrease problems associated with said debris accumulating and interfering with the operation of said suction fan.

2. The method, according to claim 1, wherein the uptake end of said conveyor means is mounted lower than the deposit end of said conveyor means.

3. The method, according to claim 1, wherein said air-inlet means is the provision of at least one opening in the side of the corn picker below said conveyor means.

4. The method, according to claim 1, wherein said air-inlet means is placed below said conveyor means.

5. The method, according to claim 1, wherein said suction means is a fan.

6. The method, according to claim 1, wherein said suction means is driven by a motor of the corn picker.

7. The method, according to claim 1, wherein said suction means is driven by a hydraulic motor.

8. The method, according to claim 1, wherein said suction means is a fan which also blows air and waste out said exhaust means.

9. The method, according to claim 1, wherein said air damning means are covers comprising rubber and metal.

10. The method, according to claim 1, further comprising mounting side plates near the deposit end of said conveyor means and on either side of the corn picker to support said suction means and to reduce air flow around said air-damning means.

11. The method according to claim 1, wherein said conveyor means comprises a conveyor bed, at last one chain driven by a driving means along at least one side of said conveyor bed, and a series of flights mounted to said chain to convey corn from one end of said conveyor bed to the other.

12. The method according to claim 11, wherein said driving means is the corn picker's engine.

13. The method according to claim 11, wherein said driving means is a hydraulic motor.

14. The method according to claim 11, further comprising providing the conveyor bed with rubber sides to make substantially air-tight contact with the sides of the corn picker.

15. The method according to claim 11, further comprising providing a deflection means for guiding corn onto said conveyor means.

16. The method according to claim 15, further comprising providing rubber extensions for the sides of said conveyor bed so that said conveyor bed may securely contact the sides of the corn picker and prevent air from passing around the sides of said conveyor bed.

17. The method according to claim 1, wherein said suction means consists of a suction fan and exhaust assembly comprising a recessed housing, a fan mounted within said recessed housing, an exhaust duct, and a waste outlet for removing waste.

18. The method according to claim 17, wherein said fan is drivably connected to a rotating means.

19. The method according to claim 18, wherein said rotating means is the corn picker's engine.

20. The method according to claim 18, wherein said rotating means is a hydraulic motor.

21. A corn picker conversion kit for converting a corn picker having a corn husking chamber, a corn husking means, an inlet for depositing corn upon the husking means, a corn uptake for moving corn from the husking bed to a storage area, and at least one air inlet means for which air moving means draws air comprising:

(a) a corn conveyor for replacing the husking means and moving the corn from the inlet to the corn uptake;

(b) an air damming means around the corn conveyor to draw air over the corn and remove debris therefrom; and (c) an air suction means for placement above the corn husking chamber to pull air through the corn to remove debris therefrom.

22. The corn picker conversion kit described in claim 21, further comprising a driving means for driving said corn conveyor.

23. The corn picker conversion kit described in claim 22, wherein said corn conveyor driving means is a hydraulic motor.

24. The corn picker conversion kit described in claim 22, wherein said corn conveyor driving means is an engine of the corn picker.

25. The corn picker conversion kit described in claim 21, wherein said corn conveyor comprises a bed with flights which transverse over said bed to transport the corn over said bed.

26. The corn picker conversion kit described in claim 25, wherein said flights are equipped with rubber extensions to protect the corn from damage as the corn is deposited on said corn conveyor.

27. The corn picker conversion kit described in claim 21, wherein said air suction means is a fan.

28. The corn picker conversion kit described in claim 27, further comprising a driving means for driving said fan.

29. The corn picker conversion kit described in claim 21, wherein said suction means is a fan which also blows air and waste out away from the corn picker.

30. The corn picker conversion kit described in claim 21, wherein said air damming means are covers comprising rubber and metal.

31. The corn picker conversion kit described in claim 21, wherein said corn conveyor is provided with rubber sides which contact the interior of the corn picker to prevent air flow around said corn conveyor.

32. The corn picker conversion kit described in claim 21, wherein said corn conveyor comprises a conveyor bed, at least one chain driven by a driving means along at least one side of said conveyor bed, and a series of flights mounted to said chain to convey corn from one end of said conveyor bed to the other.

33. The corn picker conversion kit described in claim 22, wherein said suction means consists of a suction fan and exhaust assembly comprising a recessed housing, a fan mounted within said recessed housing, an exhaust duct, and a waste outlet for removing waste.

* * * * *